US006586709B2

(12) United States Patent
Kim

(10) Patent No.: US 6,586,709 B2
(45) Date of Patent: Jul. 1, 2003

(54) STRUCTURE OF WINDOW HEAT WIRE CONNECTOR OF AUTOMOBILE

(75) Inventor: Ju Nyon Kim, Kyungki-Do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/987,479

(22) Filed: Nov. 14, 2001

(65) Prior Publication Data

US 2002/0166852 A1 Nov. 14, 2002

(30) Foreign Application Priority Data

May 10, 2001 (KR) ........................................ 2001-25425

(51) Int. Cl.$^{7}$ .................................................. B60L 1/02

(52) U.S. Cl. ....................... 219/203; 219/522; 219/541; 439/34; 439/824

(58) Field of Search ................................ 219/203, 522, 219/541, 543, 547; 200/61.78, 61.81; 338/308, 309; 439/34, 817, 819, 824

(56) References Cited

U.S. PATENT DOCUMENTS

| | | | | | |
|---|---|---|---|---|---|
| 3,553,432 | A | * | 1/1971 | Livingston et al. | 219/522 |
| 3,807,791 | A | * | 4/1974 | Boyer | 219/203 |
| 3,900,634 | A | * | 8/1975 | Plumat et al. | 219/203 |
| 3,918,783 | A | * | 11/1975 | DuRocher et al. | 219/522 |
| 3,983,527 | A | * | 9/1976 | Ohsato et al. | 219/522 |
| 4,552,611 | A | * | 11/1985 | Dery et al. | 219/203 |
| 4,707,591 | A | * | 11/1987 | Sprenger | 219/541 |
| 4,782,216 | A | * | 11/1988 | Woodard | 219/547 |
| 4,786,783 | A | * | 11/1988 | Woodard | 219/547 |
| 4,844,985 | A | * | 7/1989 | Pharms et al. | 219/203 |
| 5,324,374 | A | * | 6/1994 | Harmand et al. | 219/203 |

* cited by examiner

*Primary Examiner*—Teresa Walberg
*Assistant Examiner*—Fadi H. Dahbour
(74) *Attorney, Agent, or Firm*—Birch, Stewart, Kolasch & Birch, LLP

(57) ABSTRACT

A structure of a window heat wire connector of an automobile is disclosed to make a reduction in the number of window manufacturing processes and in the manufacturing cost by simplifying the structure of a connector that connects between heat wire and electric wire arranged on the window, the structure of a window heat wire connector comprising: connection frames connecting a plurality of heat wires aligned on the window; and an electric wire connector connected to the connection frames to supply power from battery, wherein the electric wire connector comprises; a first connection plate connected with an electric wire in the housing fixed at a vehicle body panel; a second connection plate elastically supported against the first connection plate via a first return spring; and a connection ball elastically supported via the second return spring at an accommodating part formed on the second connection plate.

2 Claims, 3 Drawing Sheets

STRUCTURE OF WINDOW HEAT WIRE CONNECTOR OF AUTOMOBILE

BACKGROUND OF THE INVENTION

1. Field of the Invention

The present invention relates to a structure of a window heat wire connector of an automobile, and more particularly to a structure of a window heat wire connector of an automobile that can improve job efficiency and cost effectiveness by modifying the connection structure of heat wire and electric wire on the window of the automobile.

2. Brief Description of the Related Art

In general, as shown in FIG. 1, a rear window 10 includes: connection frames 12 vertically aligned at the left and right edges; a plurality of heat wires 14 horizontally arranged between the connection frames 12; and an antenna 16 positioned at a lower position.

At this time, the connection frames 12 play a role as a connection unit to get power and the heat wires 14 play a role to eliminate ice or frost formed at the window by generating heat from the power.

On the other hand, a heat wire connector 18 is welded at the connection frames 12, and an electric wire connector 20 is connected to the heat wire connector 18 as shown in FIG. 2.

In other words, the heat wire connector 18 has a protruded part 18*a*, and an insertion part 20*a* is formed inside the electric wire connector 20 to accommodate the protruded part 18*a*. The electric wire connector 20 is in connection with an electric wire 20*b* to receive power supplied from battery.

Therefore, the heat wires 14 of the window 10 generate heat outside by receiving power by means of the electric wire connector 20, the heat wire connector 18 and the connection frames 12.

However, there are problems in the aforementioned structure of the window heat wire connector in that the heat wire connector has been welded at the connection frames vertically arranged on the window, thereby complicating a process of manufacturing the window and making an increase in the manufacturing cost because a particular jig and other tools are needed for welding and attachment of the heat wire connector onto the window.

In addition, the complicated process of manufacturing the window has resulted in deterioration of job efficiency and productivity.

SUMMARY OF THE INVENTION

It is an object of the present invention to solve the aforementioned problem and provide a structure of a window heat wire connector of an automobile which can reduce a number of window manufacturing processes and a manufacturing cost by simplifying the structure of a connector that connects between heat wire and electric wire arranged on the window.

In order to accomplish the aforementioned object of the present invention, there is provided a structure of a window heat wire connector of automobile, the structure comprising:

connection frames connecting a plurality of heat wires aligned on the window; and an electric wire connector connected to the connection frames to supply power from battery;

wherein the electric wire connector comprises;

a first connection plate connected with an electric wire in the housing fixed at a vehicle body panel;

a second connection plate elastically supported against the first connection plate via a first return spring and a connection ball elastically supported via the second return spring at an accommodating part formed on the second connection plate.

In addition, the second connection plate is connected with the connection frames and also with the electric wire via the first connection plate, thereby being in a close contact with the connection frames by the physical elasticity of its own member.

BRIEF DESCRIPTION OF THE DRAWINGS

For fuller understanding of the nature and object of the invention, reference should be made to the following detailed description taken in conjunction with the accompanying drawings in which.

DETAILED DESCRIPTION OF THE INVENTION

Hereinafter, preferred embodiments of the present invention will be described in detail with reference to accompanying drawings.

Figure 1:
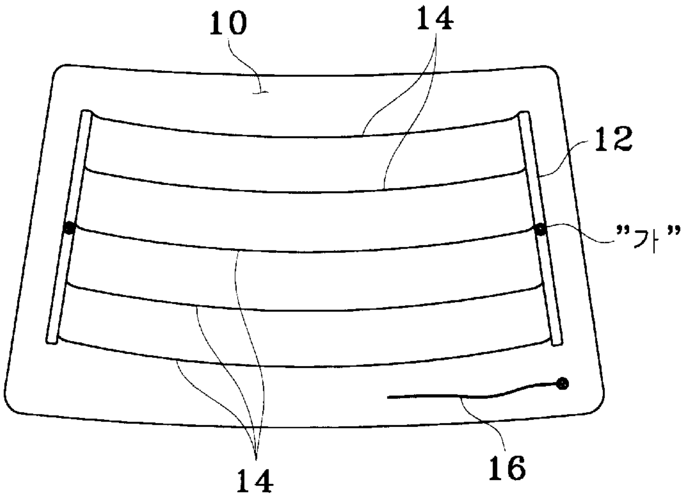
FIG. 1 (prior art)
FIG. 1 is a state view for illustrating window heat wires of a general automobile.
Figure 2:
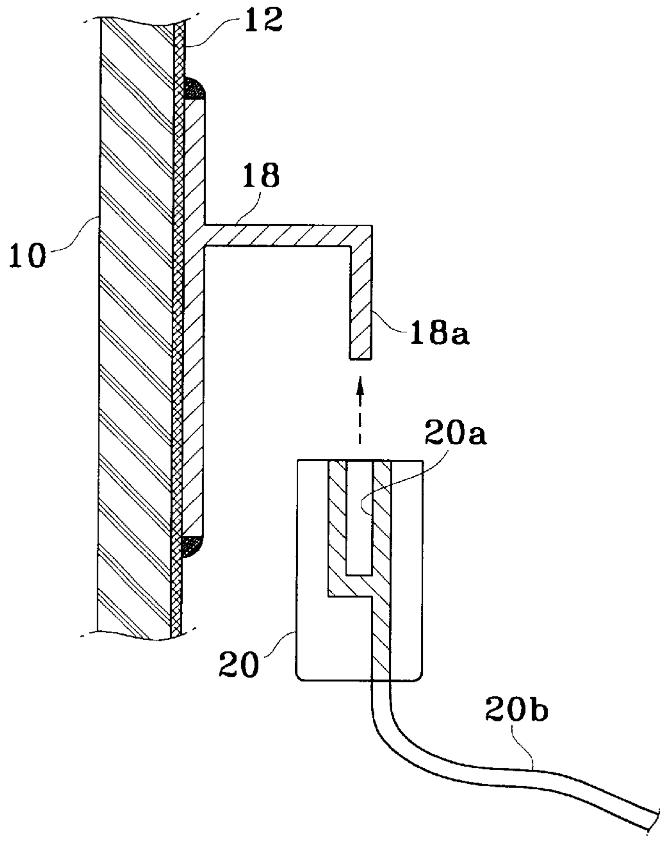
FIG. 2 (prior art)
FIG. 2 is a cross-sectional view for illustrating a structure of a conventional window heat wire connector.
Figure 3:
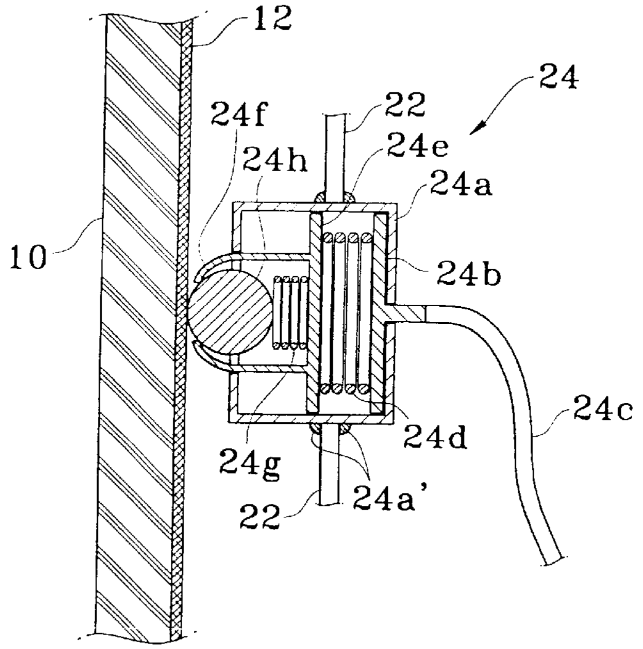
FIG. 3 is a cross-sectional view for illustrating a structure of a window heat wire connector in accordance with an embodiment of the present invention.
Figure 4:
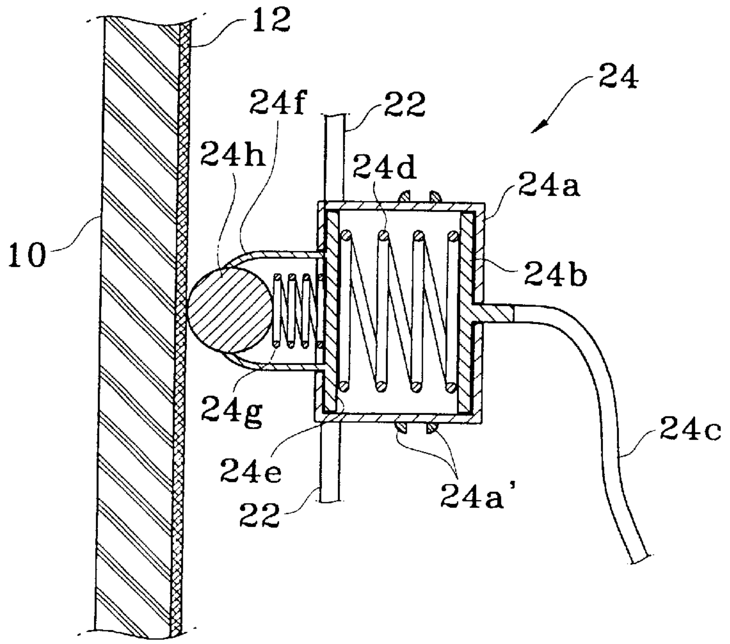
FIG. 4 is a cross-sectional view for illustrating a state of FIG. 3 prior to its assembling process.

FIG. 3 is a cross-sectional view for illustrating a structure of a window heat wire connector in accordance with an embodiment of the present invention, and FIG. 4 is a cross-sectional view for illustrating a state of FIG. 3 prior to its assembling process. At this time, the same reference numerals are used for the same parts as those shown in FIG. 1 that illustrates the structure of a conventional window heat wire connector.

As shown in the drawings, a rear window 10 of an automobile includes: connection frames 12 aligned apart vertically at the left and right edges; a plurality of heat wires 14 arranged horizontally between the connection frames 12; and an antenna 16 positioned at a lower portion.

Besides, the connection frames receive power through an electric wire connector 24 from battery. The electric wire connector 24 includes: a predetermined housing 24*a*; a first connection plate 24*b* connected with an electric wire 24*c* in the housing 24*a*; a second connection plate 24*e* elastically supported against the first connection plate 24*b* via a first return spring 24*d*; an accommodating part 24*f* formed with its edge being bent inward at the second connection plate 24*e*; and a contact sphere 24*h* accommodated in the accommodating part 24*f* via a second return spring 24*g*.

Furthermore, a hitching protruder 24*a*' protruded for combination with a vehicle body panel 22 is integrally installed at the housing 24*a*.

Therefore, if the hitching protruder 24*a*' is fit onto the vehicle body panel in the structure of the window heat wire connector thus constructed, power can be supplied to the connection frames 12 of the window 10 via the electric wire 24*c* and the electric wire connector 24 to thereby heat up the heat wires.

At this time, the first and second connection plates 24*b*, 24*e* included in the housing 24*a* of the electric wire connector 24 are in an electric connection via the first return spring 24*d* maintaining an elastic support against each other. Furthermore, the contact sphere 24*h* is also in an electric connection with the connection frames 12 via the second return spring 24*g* in the accommodating part 24*f*, retaining an elastic support.

Figure 5:
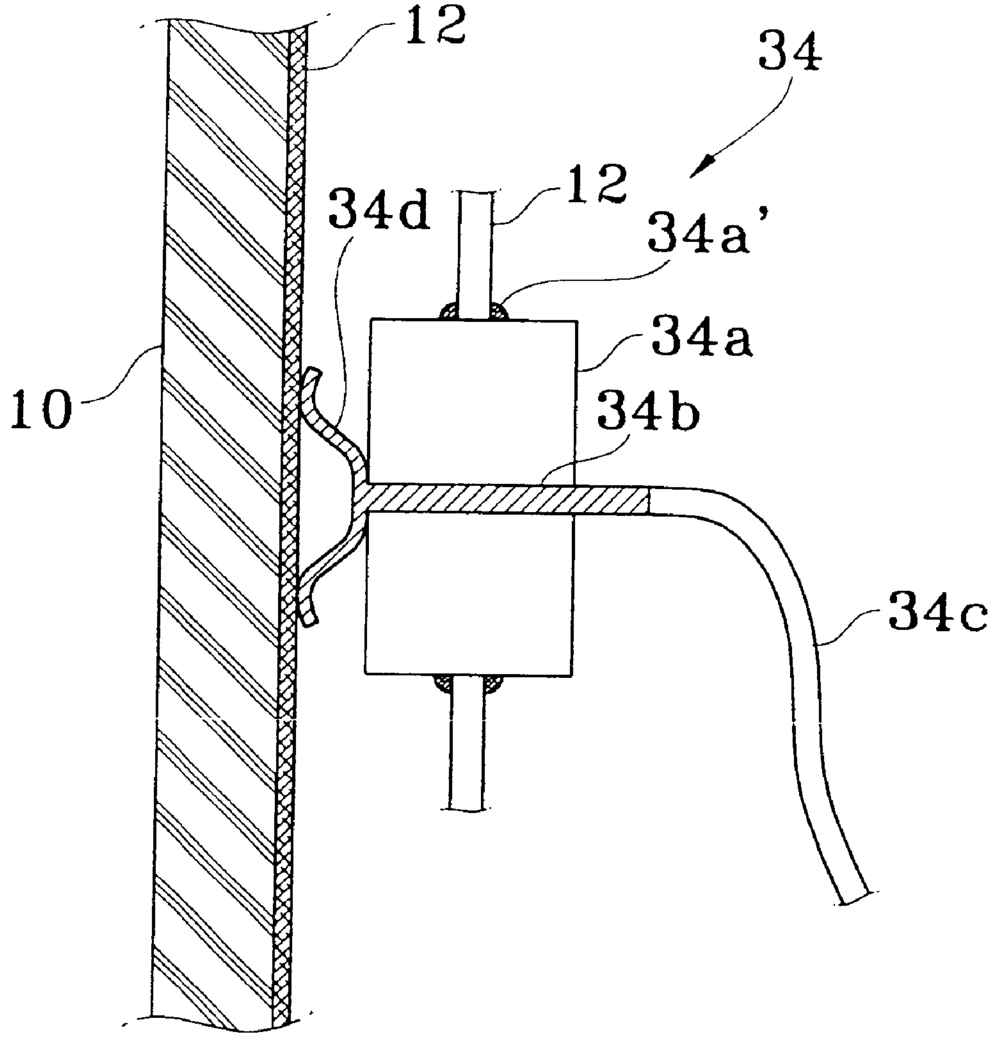
FIG. 5 is a cross-sectional view for illustrating a structure of a window heat wire connector in accordance with another embodiment of the present invention.

In addition, the electric wire connector 34 of the window 10 constructed in accordance with another embodiment of the present invention, as shown in FIG. 5, includes: a housing 34*a* fixed via a hitching protruder 34*a*' on a vehicel body panel 22; a first connection plate 34*b* with its one end being connected with an electric wire 34*c*; and a second connection plate 34*d* slightly bent at the other side of the first connection plate 34*b* with guaranteed elasticity of the member.

If the electric wire connector 34 is fit onto the vehicle body panel 22, the second connection plate 34*d* connected with the first connection plate 34*b* that wires with the electric wire 34*c* in the housing 34*a* is in a close contact with the connection frames 12 fixed at the window 10, to thereby receive power from battery.

On the other hand, if the electric wire connectors 24, 34 connected with the connection frames 12 are manufactured to supply power to the heat wires 14 of the window 10, an additional heat wire connector is not needed, thereby reducing the number of related parts and improving the productivity and job efficiency in assembly because the electric wire connectors 24, 34 are simply fit onto the vehicle body panel 22.

As described above, there are advantages in the structure of window heat wire connectors in that the electric wire connectors 24, 34 are relatively conveniently fixed via the vehicle body panel 22 to supply power to the heat wires 14 aligned at the window 10, thereby improving job efficiency and no welding process is needed for the connection of the heat wire connectors onto the connection frames 12, thereby making a reduction in the manufacturing cost.

What is claimed is:

1. A structure of a window heat wire connector of automobile, the structure comprising:

connection frames connecting a plurality of heat wires aligned on the window; and an electric wire connector connected to the connection frames to supply power from battery;

wherein the electric wire connector comprises;

a first connection plate connected with an electric wire in a housing fixed at a vehicle body panel;

a second connection plate elastically supported against the first connection plate via a first return spring; and a connection ball elastically supported via a second return spring at an accommodating part formed on the second connection plate.

2. A structure of a window heat wire connector of automobile, the structure comprising:

connection frames connecting a plurality of heat wires aligned on the window; and an electric wire connector connected to the connection frames to supply power from battery;

wherein the electric wire connector comprises;

a housing fixed at a vehicle body panel;

a first connection plate with its one end being connected with an electric wire; and a second connection plate slightly bent at the other side of the first connection plate.

* * * * *